Patented Jan. 11, 1944

2,338,829

UNITED STATES PATENT OFFICE 2,338,829

CHEMICAL PROCESS AND PRODUCT

James H. Werntz, Wilmington, Del., assignor to E. I. du Pont de Nemours & Company, Wilmington, Del., a corporation of Delaware No Drawing. Application May 6, 1941, Serial No. 392,136

8 Claims. (Cl. 260—139)

This invention relates to sulfurized hydrocarbons and to methods for their preparation.

Sulfonic acids of high surface-active efficiency are becoming increasingly important for use in various industrial operations, and it is desirable to find new and cheaper intermediates for their preparation. Petroleum hydrocarbons are probably the cheapest source of raw materials for the syntheses of intermediates for conversion to sulfonic acids. Petroleum hydrocarbons have previously been heated with sulfur but, in general, the conditions of treatment were such that hydrogen sulfide was formed in large amounts and the other products were for the most part cyclic in nature and unsuited for conversion to surface-active agents.

In a systematic investigation of the sulfurization of long-chain monoolefins under a variety of conditions it was found that only those compounds having a hydrogen atom on each ethylenic carbon could be successfully sulfurized so as to introduce substantial amounts of sulfur in the molecule. In continuing investigations following up this unexpected discovery it was found that regardless of the amount of sulfur employed not more than about 3.5 atoms of sulfur per mole of olefin could be introduced. Compounds containing between 2.5 and 3.5 atoms of sulfur per mole of olefin have unique properties in that when oxidized they yield sulfonic acids possessing excellent wetting and detergent properties. The lower limit of 2.5 atoms of sulfur per mole of olefin is critical for the production in high yields of effective wetting agents and detergents. Tertiary monoolefins differ from primary and secondary monoolefins in that they can not be similarly sulfurized to products containing from 2.5–3.5 atoms of sulfur. Since compounds containing less than 2.5 atoms of sulfur per mole of monoolefin have no practical utility as wetting and detergent intermediates, compounds of this kind are not included within the scope of this invention.

It is accordingly an object of this invention to provide a process for sulfurizing open-chain primary and secondary monoolefins containing at least 6 carbon atoms so as to produce sulfurized monoolefins containing from 2.5–3.5 atoms of sulfur per mole of olefin. It is another object to produce sulfurized open-chain monoolefins containing from 2.5–3.5 atoms of sulfur per mole of olefin. Other objects will appear hereinafter.

The above and other objects appearing hereinafter are attained by heating an open-chain monoolefin hydrocarbon having 6 or more carbon atoms and at least one hydrogen atom attached to each carbon atom of the ethylenic bond with an amount of sulfur between 2.5 and 3.5 atoms per mole of the monoolefin at a temperature between 100° and 200° C.

In the preferred practice of the invention the open-chain monoolefin is heated with stirring with about 3 atoms of sulfur per mole of the olefin at about 150° C. for about 3 hours. Throughout the reaction period the reaction mixture is stirred and blanketed with an inert gas, such as nitrogen. The reaction mixture is cooled and the product extracted with an organic solvent, such as benzene or ethyl ether.

The sulfurized hydrocarbons containing about 3 atoms of sulfur per molecule are soluble in ethyl ether and in dibutylamine but insoluble in alcohol. When heated above 200° C., the products lose hydrogen sulfide and separate sulfur. The products apparently are not changed by boiling with water or by boiling with 30% sodium hydroxide solution.

In the following examples the parts are given by weight unless otherwise stated. These examples set forth certain well defined instances of the application of this invention. They are, however, not to be considered as limitations thereof, since many modifications may be made without departing from the spirit and scope of this invention.

Example I

Seventy parts of pentadecene-8 and 35 parts of flowers of sulfur are charged into a reaction vessel equipped with a thermometer, a stirrer, a reflux condenser, and a gas inlet tube to permit blanketing the reaction mixture with nitrogen. The reaction mixture is heated at 150° to 160° C. and after about 1 hour all the sulfur has dissolved and the color of the reaction mixture has changed from yellow to brown. The reaction mixture is heated an additional 6.5 hours at 150° to 160° C. The product is cooled and diluted with an equal part of dry ethyl ether. After standing for three days, 5 parts of sulfur are filtered off. The ether solution is treated with charcoal, filtered, and evaporated. Ninety-three parts of a viscous, brownish-colored oil is obtained. The product contains 31.2% sulfur by analysis; the calculated sulfur content of $C_{15}H_{30}S_3$ is 31.4% sulfur. The product has a molecular weight of 450 compared with 306 calculated for $C_{15}H_{30}S_3$. The molecular weight is determined by the ebullioscopic method employing benzene. The sulfur is chemically combined since boiling the sulfurized hydrocarbon with two successive fresh portions of 3% sodium hydroxide solution only reduces the sulfur content to 28.2%.

Example II

Forty-two parts of hydrocarbon oil containing 85% of heptadecene and 15% of heptadecane, and prepared from 9,10-octadecenyl alcohol by decarbonylation is reacted with 14.4 parts of sulfur under the same conditions as described in Example I. Fifty-five parts of a brownish colored oil are obtained which does not separate sulfur when diluted with dry ethyl ether.

Example III

Fifty-six parts of hexadecene-1 and 24 parts of flowers of sulfur are stirred together under a reflux condenser while exposing to air at 150° to 160° C. for 4.5 hours. The product is diluted with 140 parts of ether and 1 part of unreacted sulfur is separated. Seventy-five parts of a brown oil is recovered by evaporation of the ether. The oil analyzes 28.7% sulfur; calculated for $C_{16}H_{32}S_3$, 30%. The theoretical molecular weight for $C_{16}H_{32}S_3$ is 320; found by analysis, 572. One atom of sulfur can be removed by boiling with an aqueous solution of sodium sulfide. Sulfur analysis indicates the product to be $C_{16}H_{32}S_2$. It is insoluble in alkaline solutions and analysis for mercaptan sulfur indicates substantial absence of thiol groups.

The sulfurization described herein can also be successfully carried out in a closed container. For example, when 56 parts of hexadecene-1 and 24 parts of sulfur are heated in a rotating steel bomb at 160° C. for 9 hours, 75 parts of ether-soluble oil and 1.5 parts of unreacted sulfur are obtained.

When 224 parts of hexadecene-1 and 128 parts of flowers of sulfur are stirred together at 150° C. for 6 hours while blanketing with $H_2S$, all the sulfur dissolves. By means of an ether treatment, 28 parts of unreacted sulfur are separated from 315 parts of sulfurized hydrocarbon.

Example IV

Twenty parts of an ethylene polymer of an indicated average molecular weight of about 406 and corresponding to a $C_{29}H_{58}$ olefin is stirred with 5 parts of sulfur at 150° to 160° C. for 7 hours. The product is dissolved in ether and filtered. Evaporation of the ether leaves 17 parts of a soft, brownish-colored grease. The product analyzes 18.7% sulfur; calculated for $C_{29}H_{58}S_3$, 19.1% sulfur.

As raw materials for sulfurization there can be employed open-chain monoolefin hydrocarbon having a hydrogen atom on each ethylenic carbon and containing at least 6, and preferably 8 or more, carbon atoms. A few examples of suitable olefins include hexene-3, heptene-2, tridecene-7, nonadecene-10, 3,9-diethyltridecene-6, dodecene-1, octene-1, heptadecene-7, heptadecene-8, triacontene-14, pentatriacontene-17, olefins obtained by decarboxylation of such acids as oleic acid, 10,11-undecylenic acid, etc., olefins obtained by decarbonylation of oleyl alcohol or such unsaturated alcohols as are obtained by carboxyl reduction of sperm oil, olefins obtained by the dehydration of the saturated alcohols obtained by carboxyl reduction of natural fats and waxes, such as coconut oil, beef tallow, beeswax, etc., and the unsaturated polymers of ethylene. In general, it is preferred to use olefins which are liquids at the reaction temperature.

Although ratios of sulfur:olefin in excess of about 3.5 atoms of sulfur to 1 olefin molecule can be used, ratios of 2.5–3.5:1 are generally used and preferably of about 3:1. It is preferred to carry out the reaction at a sufficiently elevated temperature that the sulfur is in a molten state but not at so high a temperature as to have the formation of substantial quantities of hydrogen sulfide. In general the sulfurization reaction is carried out at 100° to 200° C. and preferably at 140° to 160° C.

While pressures above or below atmospheric pressure can be used, generally it is preferred to operate at atmospheric pressure.

The process can be operated in an atmosphere of air or hydrogen sulfide or in an inert atmosphere such as nitrogen.

If desired, the sulfurization can be carried out in the presence of solvents or diluents which do not undergo a reaction with sulfur. Examples of such solvents and diluents include saturated petroleum hydrocarbons, unreactive olefins such as tetraisobutylene, etc.

Suitable agitation is desirable but not necessary for successful results.

The reaction at the preferred temperature is substantially complete in about 1 to 3 hours. In some instances the reaction mixture is advantageously heated for a substantial period of time after the reaction appears to be complete.

Since the reaction time is generally short and the temperature of the reaction is not excessively high, in general, it is not necessary to use catalysts. If desired, however, there can be used sulfurization catalysts as well as agents known to activate double bonds, as for example: 2-mercaptobenzothiazole; tetramethylthiuram disulfide; 2-mercaptothiazoline; ascaridole; iodine; zinc chloride; fuller's earth; tetramethylthiuram monosulfide and zinc oxide; ethyl xanthogen disulfide; diethyldisulfide; zinc stearate with tetramethylthiuram monosulfide; di-o-tolylthiourea; hexamethylenetetramine; diphenylguanidine; etc.

The sulfurized hydrocarbons of this invention are particularly valuable as intermediates for conversion by oxidation to valuable surface-active sulfonic acids. Furthermore the addition of small quantities of the products of this invention to lubricating oils materially enhance their value as lubricants by increasing their oxidation resistance, oiliness, film strength, and resistance to formation of corrosive products.

As many apparently widely different embodiments of this invention may be made without departing from the spirit and scope thereof, it is to be understood that I do not limit myself to the specific embodiments thereof except as defined in the appended claims.

I claim:
1. The process for the production of sulfurized hydrocarbons having the molecular formula $C_nH_{2n}S_3$ in which $n$ is an integer greater than 5 which comprises bringing an open-chain monoolefin hydrocarbon of at least 6 carbon atoms and having at least one hydrogen on each double bonded carbon atom into contact with about 3 atomic proportions of sulfur for each mole of monoolefin hydrocarbon, and heating the mixture to between 100° and 200° C., thereby bringing about reaction of sulfur with said hydrocarbon.
2. The process in accordance with claim 1 characterized in that the reaction is carried out at a temperature between 140° C. and 160° C.

3. The process in accordance with claim 1 characterized in that the reaction is carried out for a period of about 1 to 3 hours.

4. The process of preparing a sulfurized hydrocarbon comprising a sulfur derivative of an open-chain monoolefin hydrocarbon having at least one hydrogen on each double bonded carbon atom whose molecular formula is $C_nH_{2n}S_3$ in which $n$ is an integer greater than 5, which comprises heating with agitation and for 1 to 3 hours a mixture of sulfur and an open-chain monoolefin hydrocarbon of at least 6 carbon atoms, and having hydrogen on each double bonded carbon, to between 140° and 160° C., said sulfur being present in an amount of about 3 atomic proportions of sulfur per mole of monoolefin hydrocarbon.

5. The process in accordance with claim 1 characterized in that the open-chain monoolefin hydrocarbon contains at least 8 carbon atoms.

6. The sulfurized straight-chain pentadecene having a molecular formula corresponding substantially to —$C_{15}H_{30}S_3$ and containing 31.2% sulfur.

7. The sulfurized hydrocarbon whose molecular formula is $C_nH_{2n}S_3$, in which $n$ is an integer greater than 5, and which is obtained by heating a monoolefin hydrocarbon with sulfur in an amount of about 3 atomic proportions of sulfur per mole of monoolefin hydrocarbon, said monoolefin hydrocarbon being an open-chain monoolefin hydrocarbon of at least 6 carbon atoms and having hydrogen on each double bonded carbon atom.

8. The sulphurized ethylene polymer having a molecular formula corresponding substantially to $C_{29}H_{58}S_3$ and containing 18.7% sulphur.

JAMES H. WERNTZ.